(12) United States Patent
Krebs

(10) Patent No.: US 7,725,205 B1
(45) Date of Patent: May 25, 2010

(54) APPARATUS AND METHODS FOR PROVIDING A HOMOGENOUS I/O INTERFACE FOR CONTROLLING A HETEROGENOUS MIXTURE OF HARDWARE I/O SYSTEMS

(75) Inventor: Jerrod P. Krebs, San Jose, CA (US)

(73) Assignee: Novellus Systems, Inc., San Jose, CA (US)

( * ) Notice: Subject to any disclaimer, the term of this patent is extended or adjusted under 35 U.S.C. 154(b) by 213 days.

(21) Appl. No.: 11/525,712

(22) Filed: Sep. 21, 2006

(51) Int. Cl.
*G06F 19/00* (2006.01)
*G06F 9/46* (2006.01)
*G06F 13/12* (2006.01)
*G06F 15/18* (2006.01)
*G11C 29/00* (2006.01)

(52) U.S. Cl. .................. 700/96; 718/100; 718/103; 710/62; 706/33; 714/723

(58) Field of Classification Search .............. 718/100, 718/103; 710/62; 700/96; 706/33; 714/723
See application file for complete search history.

(56) References Cited

U.S. PATENT DOCUMENTS

| | | | | |
|---|---|---|---|---|
| 5,513,127 | A * | 4/1996 | Gard et al. ............ | 709/223 |
| 6,233,610 | B1 * | 5/2001 | Hayball et al. ......... | 709/223 |
| 6,304,934 | B1 | 10/2001 | Pimenta et al. | |
| 6,480,756 | B1 * | 11/2002 | Luh et al. ............. | 700/108 |
| 6,615,088 | B1 * | 9/2003 | Myer et al. ............ | 700/20 |
| 7,047,095 | B2 | 5/2006 | Tomoyasu | |
| 7,127,358 | B2 | 10/2006 | Yue et al. | |
| 7,143,320 | B2 * | 11/2006 | Cavin ................. | 714/704 |
| 7,155,590 | B2 * | 12/2006 | Mathis ................ | 711/164 |
| 7,197,723 | B2 * | 3/2007 | Braun et al. .......... | 716/3 |
| 7,324,855 | B2 | 1/2008 | Ushiku et al. | |
| 7,398,127 | B2 * | 7/2008 | Boger et al. ........... | 700/9 |
| 2003/0041135 | A1 * | 2/2003 | Keyes et al. ........... | 709/223 |
| 2005/0177267 | A1 * | 8/2005 | Chang et al. .......... | 700/121 |
| 2007/0282480 | A1 * | 12/2007 | Pannese et al. ........ | 700/213 |

\* cited by examiner

*Primary Examiner*—Albert DeCady
*Assistant Examiner*—Thomas H Stevens
(74) *Attorney, Agent, or Firm*—Weaver Austin Villeneuve & Sampson LLP

(57) ABSTRACT

Disclosed are apparatus and methods for controlling a heterogeneous mixture of hardware devices in a variety of semiconductor process equipment. In general, a generic Input and Output (I/O) interface is provided between a process management module for specifying control operations and the actual hardware devices of a particular process tool. The process management module generally includes high level processes and/or user interfaces for controlling one or more process tool(s) by interacting with a set of generic device objects that are abstractions of actual hardware devices of such tool(s). The I/O interface translates interactions with the generic device objects into interactions with the different hardware devices. The process management module utilizes one or more of these generic device objects to specify operation, in a generic manner, of hardware devices and the I/O interface translates such operations into operations that are specific to the different hardware devices. As a result of this interface that manages and separates the interactions with the generic device objects from interactions with the hardware, both the process management module and the generic device objects can remain unchanged when changes occur to the hardware configuration or to an individual hardware device.

19 Claims, 8 Drawing Sheets

APPARATUS AND METHODS FOR PROVIDING A HOMOGENOUS I/O INTERFACE FOR CONTROLLING A HETEROGENOUS MIXTURE OF HARDWARE I/O SYSTEMS

BACKGROUND OF THE INVENTION

The present invention relates generally to processing of semiconductor wafers in a plurality of processing systems. More specifically, it relates to controlling the operation of devices in such processing systems.

Generally, the industry of semiconductor manufacturing involves highly complex techniques for fabricating integrating circuits from semiconductor materials that are layered and patterned onto a substrate, such as silicon, by various process systems. For example, a first process system deposits a layer of material, while another process system etches a pattern in such deposited material.

A plurality of hardware I/O controllers are typically used to control various components in each process system. Generally, software is customized so as to control the particular types of I/O controller devices that are present in each particular process system since different types of I/O controllers require different control protocol. This software scheme has several disadvantages. For example, the software for controlling hardware of one type of process system cannot be used to control hardware on another type of process system having different hardware. Additionally, if the hardware of a process system is changes in any way, e.g., replaced or upgraded, the software for controlling the pervious hardware typically will not operate properly, if at all, for the new hardware. For instance, existing hardware that is controlled using a first type of interface protocol may be replaced by new hardware that utilizes a second, different type of interface protocol. That is, the commands and format of communicating with various types of hardware can radically vary so that the control software for one hardware device cannot control a different type of hardware device. When a hardware device is replaced with a device having a different control protocol, the software typically also has to be replaced or changed significantly. The software will likely have to be changed throughout since the hardware-dependent software portions are typically integrated throughout the software code. The amount of time required to alter control software can be a significant barrier to implementing hardware changes in a process system.

Accordingly, it would be beneficial to provide a more generic interface for controlling various types of hardware devices that utilize various communication protocols. That is, what is needed is an I/O interface that can be utilized to control a heterogeneous mixture of hardware I/O devices without requiring significant software changes for hardware changes.

SUMMARY OF THE INVENTION

Apparatus and methods for controlling a heterogeneous mixture of hardware devices in a variety of semiconductor process equipment are provided. In general, a generic Input and Output (I/O) interface is provided between a process management module for specifying control operations and the actual hardware devices of a particular process tool. The process management module generally includes high level processes and/or user interfaces for controlling one or more process tool(s) by interacting with a set of generic device objects that are abstractions of actual hardware devices of such tool(s). The I/O interface translates interactions with the generic device objects into interactions with the different hardware devices. The process management module utilizes one or more of these generic device objects to specify operation, in a generic manner, of hardware devices and the I/O interface translates such operations into operations that are specific to the different hardware devices. As a result of this interface that manages and separates the interactions with the generic device objects from interactions with the hardware, both the process management module and the generic device objects can remain unchanged when changes occur to the hardware configuration or to an individual hardware device.

In one embodiment, a computer implemented system for controlling a heterogeneous mixture of hardware controller and/or devices is disclosed. The system includes a process management module that is configurable to control a process tool a plurality of generic device objects upon which the process management module is operable to indirectly control corresponding hardware devices of the process tool. The generic device objects are each controllable in a generic manner that is independent of the particular communication protocol utilized by the corresponding hardware devices. The system further includes a device interface module for translating operations performed with respect to the generic device objects into operations performed with respect to the corresponding hardware devices.

In a specific implementation, each device object is mapped to a corresponding hardware device and the device interface module translates each operation on a particular device object into the communication protocol utilized by the particular device object's corresponding hardware device. In another embodiment, the process management module includes a plurality of module objects that are each configurable to control a particular hardware module of the process tool via performing operations with respect to one or more of the device object(s) so that operation of each hardware module is independent of operation of the other hardware modules.

In another aspect, each device object is mapped to one or more input/output (IO) point(s) and each IO point is mapped to a corresponding communication channel of a corresponding hardware device, and the device interface module is operable to translate each operation on a particular IO point into a the communication protocol utilized by the corresponding communication channel that is mapped to the particular IO point. In a further aspect, the hardware devices are in the form of one or more controllers coupled to one or more other hardware devices, and the device interface module includes one or more drivers that each correspond to a particular hardware controller that is coupled to one or more hardware devices via one or more communication channels that are each mapped to a particular IO point. Each driver translates an operation with respect to each IO point that is mapped to a mapped communication channel of the each driver's corresponding hardware controller into a translated operation with respect to the corresponding hardware controller's mapped communication channel. In yet a further aspect, the translated operation includes inputting a command to the corresponding hardware controller that specifies an operation is to be performed with respect to the mapped communication channel. In another aspect, the mapped communication channel is specified by a format selected from one of the following: a port identifier, a IO identifier, and an address value. In another feature, the input command has a format selected from one of the following: a digital signal, an analog signal, a serial IO signal. In another aspect, the process management module is configured to perform operations with respect to the IO points and not the communications channels of the hardware devices.

In another embodiment, each device object includes a set of operations that are selectable by a user whereby selection causes the selected operation to be performed on one or more IO point(s) that are mapped to the each device object, as well as to be indirectly performed with respect to the one or more communication channel(s) that are mapped to the mapped IO point(s). In a further aspect, at least one of the operations requires the user to input a parameter value for setting an operating condition of a corresponding hardware device.

In another embodiment, the mapping of the IO point(s) to corresponding communication channels that is utilized by the device interface module is reconfigurable without alteration of the process management module or the generic devices so that operation of the process management module and the generic devices is independent of the configuration of such mapping. In another feature, the translated operation includes inputting a signal, via the mapped communication channel, to the corresponding hardware device that is coupled to the mapped communication channel. In an alternative embodiment, the translated operation includes outputting an output signal, via the mapped communication channel, from the corresponding hardware device that is coupled to the mapped communication channel so that the output signal is represented by a value of the IO point that corresponds to the mapped communication channel.

In another specific implementation example, the process management is operable to interact directly with the generic objects and not directly with the hardware devices. In another feature, the system includes a plurality of controller objects for grouping one or more device objects and their IO point(s) together so that each controller object and its IO points can be operated on together as a group. In one aspect, the system is in the form of computer instructions stored within at least one computer readable at least one computer readable.

In another aspect, the system includes a simulation module having a plurality of simulated hardware devices for simulating the operation of the hardware devices. The device interface module is configured to translate operations performed with respect to the generic device objects into operations performed with respect to the corresponding simulated hardware devices.

In an alternative embodiment, the invention pertains to a method for controlling a heterogeneous mixture of hardware controller and/or devices using a plurality of generic device objects that are each associated with one or more operations. In one example, a first operation of a first device object is selected. This first operation is mapped to one or more communication channels of one or more hardware controller(s). The first operation is the translated to a translated operation based on the particular communication protocol of the mapped communication channel(s). The translated operation is applied to the mapped communication channel(s) of the one or more hardware controller(s) so as to control one or more hardware device that are coupled to such mapped communication channel(s). Each selectable operation of each device object is independent of the particular communication protocol utilized by the hardware controller that is mappable to such each selectable operation. In a specific embodiment, the first operation is translated into the translated operation so that the translated operation has a communication protocol utilized by hardware controller coupled to the mapped communication channel.

These and other features and advantages of the present invention will be presented in more detail in the following specification of the invention and the accompanying figures which illustrate by way of example the principles of the invention.

BRIEF DESCRIPTION OF THE DRAWINGS

The present invention is illustrated by way of example, and not by way of limitation.

DETAILED DESCRIPTION OF THE INVENTION

Reference will now be made in detail to a specific embodiment of the invention. An example of this embodiment is illustrated in the accompanying drawings. While the invention will be described in conjunction with this specific embodiment, it will be understood that it is not intended to limit the invention to one embodiment. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well known process operations have not been described in detail in order not to unnecessarily obscure the present invention.

Figure 1:
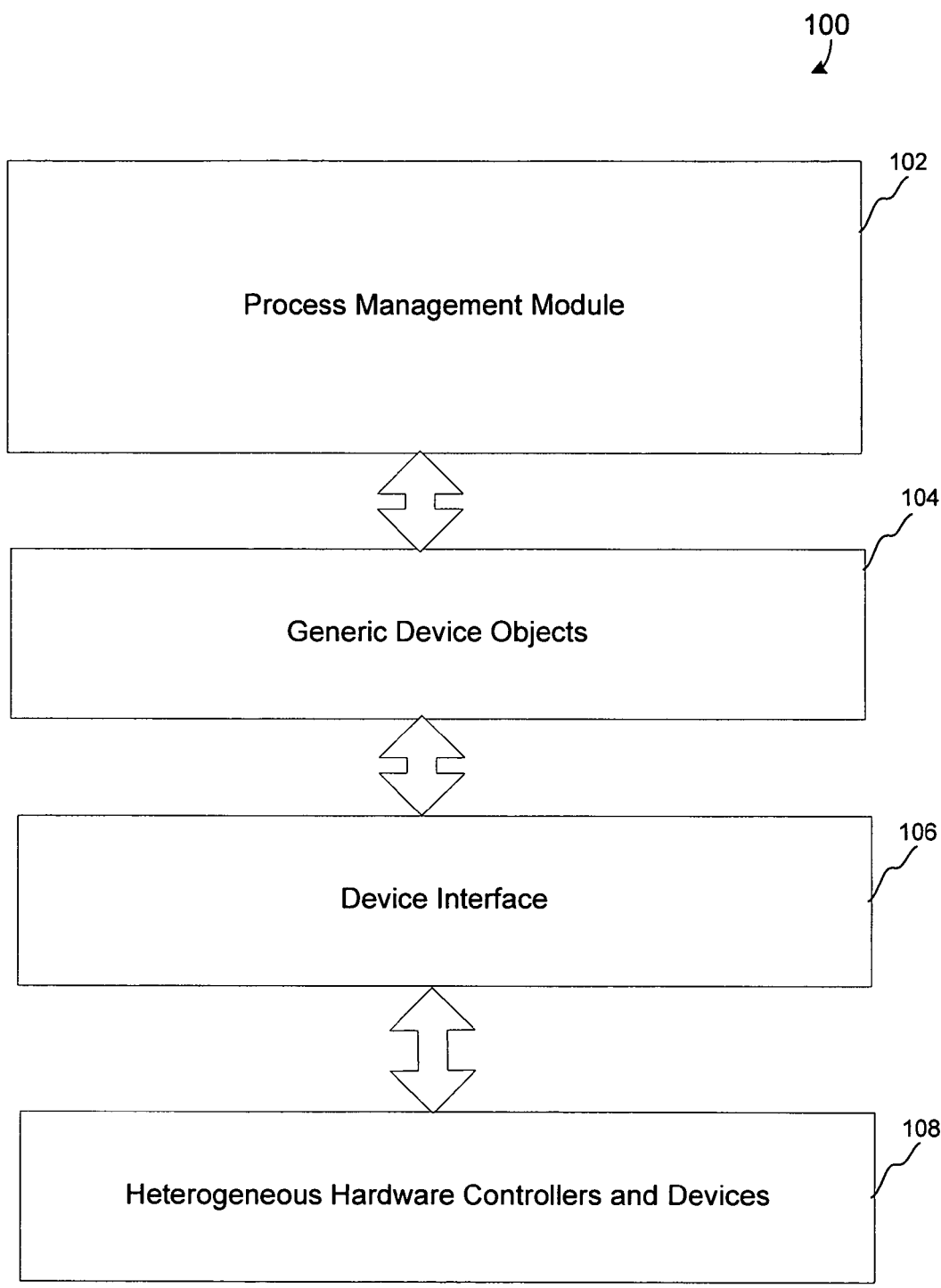
FIG. 1 is a block diagram of a system for controlling hardware devices in a process tool in accordance with one embodiment of the present invention.

In general, embodiments of the present invention provide a generic interface for managing a heterogeneous mixture of hardware controllers and devices. FIG. 1 is a block diagram of a system 100 for controlling hardware devices in a process tool in accordance with one representation of the present invention. The control system 100 includes a process management module 102, a plurality of generic device objects 104, and a device interface module 106 for controlling a plurality of different hardware controllers and devices 108. The process management module 102 generally includes high level software and/or user interfaces for controlling one or more process tools, and the generic device objects are abstractions of actual hardware devices. The process management module 102 utilizing one or more of these generic device objects 104 to specify operation, in a generic manner, of hardware devices. That is, both the process management module 102 and the generic device objects can remain unchanged even when changes occur to a corresponding hardware device or its hardware controller.

Hardware devices 108 can include any suitable hardware component of a process tool that can be controlled. Examples of device include, but are not limited to, a valve, door, pedestal, lift, indexer, gauge, sensor, mass flow controller (MFC), unit pressure controller (UPC), wafer pedestal, wafer lift, wafer robot, temperature controller, generator, etc.

Each hardware device may typically be controlled by a suitable hardware controller. Hardware controllers can take any suitable form and utilize any suitable interface protocol for specifying operation of various hardware devices. For example, a hardware controller can include input and/or output mechanisms for inputting or outputting discrete states, such as digital inputs and/or outputs (e.g., high or low signals) signals or analog inputs and/or outputs. A hardware device can include a stream type I/O mechanism, such as a multi-port serial or USB interface, or a memory mapped I/O mechanism (e.g., in a blackplane controller), where each device that is coupled to the controller is accessed via a specific address. Although devices that have IO in the form of one or more voltage signal(s) are described below, of course, embodiments of the present invention may be applied to devices that utilize other types of IO signals, such as current, temperature, bit values, etc.

The device interface module 106 in generally operable to translate operations performed with respect to the device objects into operations performed with respect to the corresponding hardware devices or their corresponding hardware controllers. For instance, the process management module 102 performs generic operations with respect to a device object and this generic operation is translated into the particular communication protocol utilized to manage the hardware device, usually via the appropriate hardware controller.

Figure 2:
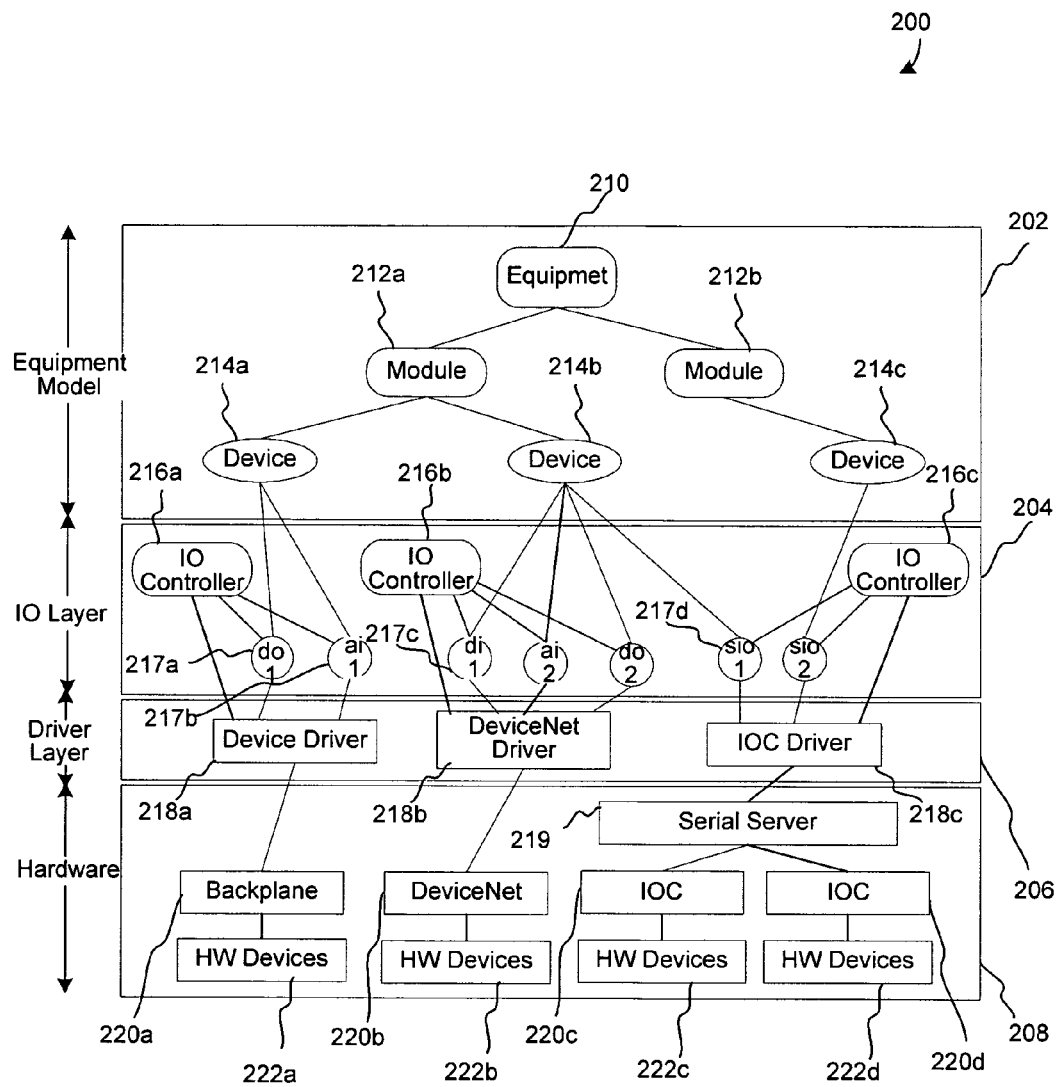
FIG. 2 is a diagrammatic representation of a detailed control system in accordance with a specific implementation of the present invention.

FIG. 2 is a diagrammatic representation of a detailed control system 200 in accordance with a specific implementation of the present invention. The control system 200 includes an equipment model 202 that will typically include software processes or an equipment object for managing a particular process system. For instance, the equipment model 202 may be arranged hierarchically to correspond to different logical levels of a particular processing system. In a specific implementation, the equipment model includes an equipment abstraction 210 that represents a specific process system, such as an etch type processing system, and this equipment abstraction can be logically divided into a plurality of module abstractions 212 that each represent a particular module of the processing system. Each module 212 may also be associated with one or more device objects 214 that each represent an actual hardware device, such as a valve, of the process tool.

Each module 212 may have its own execution engine that works with its own set of device abstractions or objects 214. The execution engine of a particular module describes what a wafer that is loaded into such module experiences, e.g., describes the wafer process and its operating conditions for such module. To implement a particular wafer process, each module is operable to control one or more abstract device objects 214 and, indirectly their corresponding physical devices as further described below. Preferably, each module's execution engine is designed to work independently of the executions engines of other modules.

In this implementation, each device object 214 is linked to a set of IO points, such as IO points 217a through 217d, of an IO Layer 204, and each IO point represents a physical communication channel of a hardware device. In the IO Layer 204 of FIG. 2, device object 214a is associated with IO points DO1 and AI1; device object 214b is associated with IO points DI1, AI2, and DO2; and device object 214c is associated with IO points SIO1 and SIO2.

When a device object 214 and one or more of its associated IO point(s) are operated upon, the Driver Layer 206 translates these IO point operations into operations that are performed with respect to the actual hardware devices, for example, via performing operations on the appropriate hardware controllers. To implement this translation mechanism, the Driver Layer 206 may include a plurality of drivers 218 that provide an interface between the IO Layer 204 and the Hardware Layer 208. Each driver can correspond to one or more hardware controller(s) and operate to translate interactions with the I/O points 217 of the I/O layer 204 into appropriate interactions with the actual hardware controllers 220 or 219. For instance, an operation may be translated into an operation for inputting a signal to a particular hardware device or outputting/sensing a signal from a hardware device. In the latter example, the output or sensed signal can then be represented as a value of the IO point, which value is accessible by one or more of the equipment module processes.

To facilitate one implementation of these mechanisms for translating IO point operations, the driver layer 206 maps the IO points of the abstract devices to a specific communication channel of a specific controller. Each controller device (e.g., 220 or 219) has one or more preconfigured communication channel(s) for communicating with specific hardware devices. Each IO point can take any suitable form. For instance, an IO point may correspond to a digital output (DO) for outputting a digitally formatted signal from the control software to the hardware device, a digital input (DI) for receiving a digitally formatted signal from the hardware device, an analog output (AO) for outputting an analog type signal, an analog input (AI) for receiving or obtaining an analog type signal, and a serial IO (SIO) for outputting and/or receiving signals on a serial bus.

Each driver 218 in the Driver Layer 206 may include one or more individual device drivers for controlling one or more hardware devices 222, for example, via one or more controllers 220 and/or 219. As shown, Device Driver 218a is associated with a backplane type controller 220a; DeviceNet Driver 218b is associated with a Device Net type controller 220b; and IOC (IO Controller) Driver 218c is associated with a serial server 219 that interfaces with an IOC (IO Controller) 220c and IOC 220d. The different types of hardware controllers 220 and 219 may have different interface protocol. For instance, backplane controller has an address based control interface. DeviceNet controller 220b is a more intelligent network type controller that does not require discrete communication channels. Thus, this type of controller may allow the IO points to be bypassed so that the device objects 214 can communicate directly with the device drivers. IOC 220c and IOC 220d have protocols that allow commands to be issued with respect to particular pins or ports that are each coupled to an input or output of a hardware device. In sum, each controller may have any suitable number and type of input and output mechanisms.

In this configuration, each IO point is linked to a particular hardware communication channel between a hardware controller and a particular hardware device. Each device object 214 is also configured to interact with one or more abstract IO point(s) rather than the actual hardware communication channels of the hardware devices. Thus, a processes interaction with each abstract device object 214 is not tied directly to a communication channel of a hardware device, such as a controller device. Accordingly, interaction with each device object is not dependent on a particular hardware configuration. Since interaction with each abstract device object 214 is not tied directly to a specific hardware configuration, the abstract device object and its controlling execution engine do not have to be altered when a change occurs in the hardware device configuration.

The IO points of the IO Layer could also be grouped together, for example, in abstract controller object groups, such as IO controllers 216a through 216c, to be managed together. This grouping can be used to perform operations per each controller set. For instance, a shutdown operation may be performed for a particular controller group to thereby automatically deactivate the IO points for the particular controller group. When a particular set of IO points are deactivated and made unavailable for control input or output, the communication channels that map to such deactivated IO points are also deactivated or made unavailable.

Each abstract controller group does not have to necessarily correspond to an actual controller so that any suitable set of communication channels may be flexibly managed together. In sum, the IO configuration of the IO Layer does not have to be tightly coupled with the actual IO configuration of the physical controllers. Each abstract controller group may correspond to a particular physical controller's driver so that the corresponding physical controller can be deactivated via the abstract controller construct. Of course, if an abstract controller group is associated with communication channels of more than one physical controller and its driver, then deactivation of the abstract controller group results in each of the associated communications channels of the various physical controllers being deactivated or inoperable. In either case, the deactivated IO points and their corresponding communication channels would be defined as inoperable with respect to the management software (e.g., execution engines of the equipment model 202).

The IO Layer objects can be arranged in any suitable manner to map IO points to real communication channels. In a specific implementation, the IO Layer uses a flat mapping scheme. For instance, there can be two hardware controllers that each has a particular number of communication channels, such as 20 digital IO's for each controller (1-20 and 1-20) and IO points 1-40 can be mapped to specific ones of the two sets of 20 IO's of the two controllers. Additionally, one could merely map to subset of communication controllers. For example, if only 15 communication channels on a first controller and 20 communication channels of a second controller were being used for devices, then IO points 1-35 could be made available in the IO Layer. Descriptive names could also be used to reference the available IO points. For example, a digital input of a valve could be accessed through an IO point called "digital valve input" in the IO layer.

In effect, the equipment model and IO layer are both isolated from being affected by hardware changes by a driver layer 206. Since the mapping between the points and the physical communication channels is performed in a separate layer (i.e., IO Layer 204 of FIG. 2 or Device Interface 106 of FIG. 1), the physical configuration can be altered and result in changes only to the IO Layer. For example, IO points 1-10 can initially belong to a first abstract controller and these IO points map to digital inputs DI1-5 and digital outputs DO1-5 of a first controller, which controls five devices. Let's suppose that the communication channels were then reconfigured so that two devices were controlled by a first controller having digital inputs DI1-3 and outputs DO1-3 and three other devices were controlled by a second controller having digital inputs DI1-2 and outputs DO1-2. The IO points 1-6 could then be reconfigured to belong to a first controller and IO points 7-10 to belong to a second abstract controller. IO points 1-3 may then map to DI1-3 of the first controller which interface with three devices, and IO points 4-6 map to DO1-3 of the same first controller which also interface with the same three devices. In contrast, IO points 7 and 8 may map to DI1-2 of the second controller which interface with two devices and IO points 9 and 10 map to DO1-2 of the same second controller which interface with the same two devices.

Figure 3:
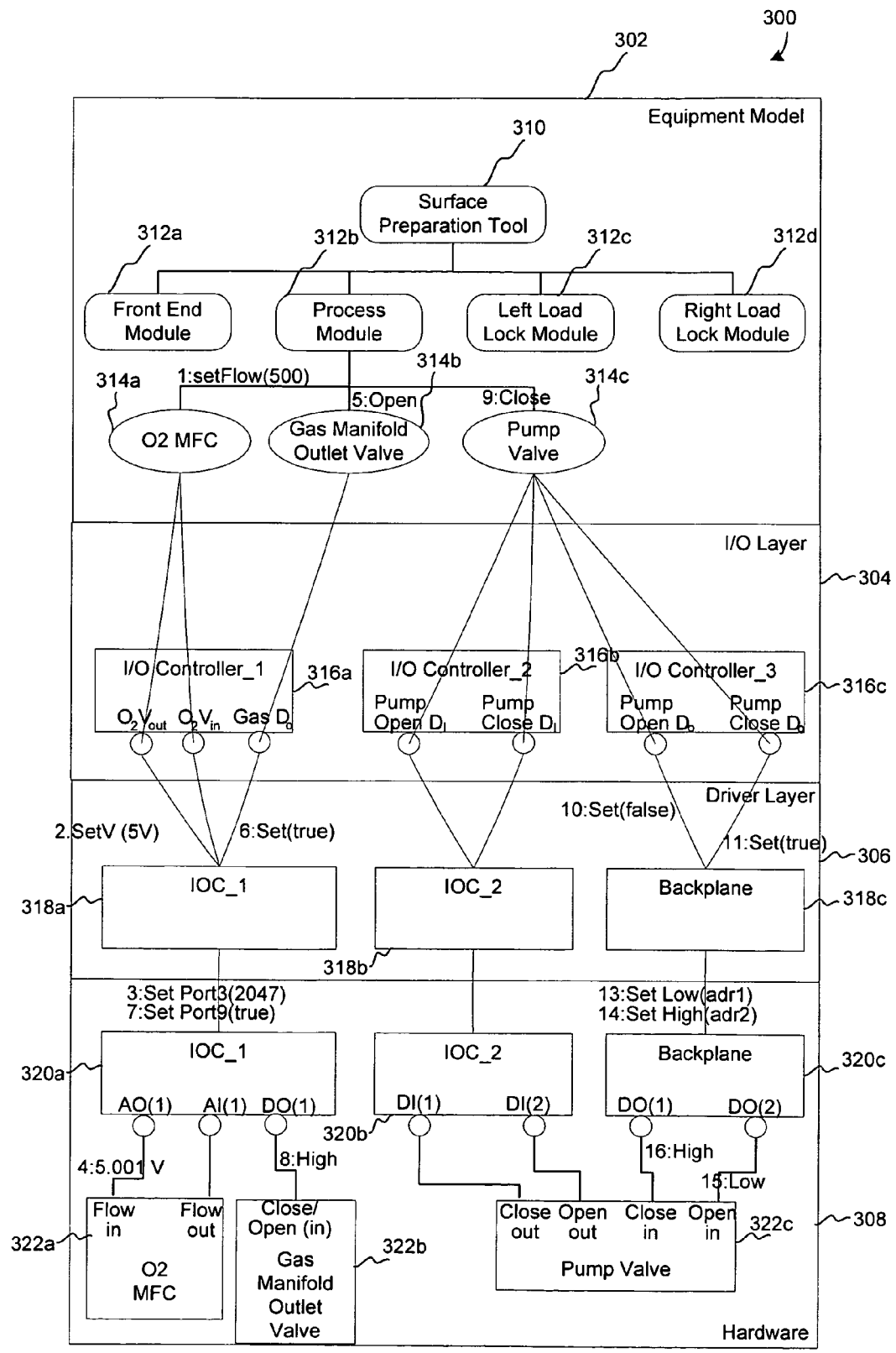
FIG. 3 is a diagrammatic representation of a specific control system in accordance with one application of the present invention.

FIG. 3 is a diagrammatic representation of a specific control system 300 in accordance with one application of the present invention. This figure will be used to describe a procedure for utilizing such control system 300 and its operation. As shown, this system 300 includes an equipment model 302 for a surface preparation tool 310, which includes a front end module 312a, a process module 312b, a left load lock module 312c, and a right load lock module 312d. Each module is associated with one or more abstract device objects although only the device objects 314 for the process module 312b are illustrated for clarity. The devices objects 314 of the process module 312b include an $O_2$ MFC (mass flow controller) 314a, a gas manifold outlet valve 314b, and a pump valve 314c.

Each device object may take any suitable form so as to allow a user or automated process to control various physical devices through such abstract device objects. These device objects include generic mechanism for controlling a device so that the underlying hardware device configuration and format is transparent to the user. That is, the device objects are independent of specific hardware signal format, controller type, driver type, and the specific configuration of the devices in relation to specific controllers.

Figure 4:
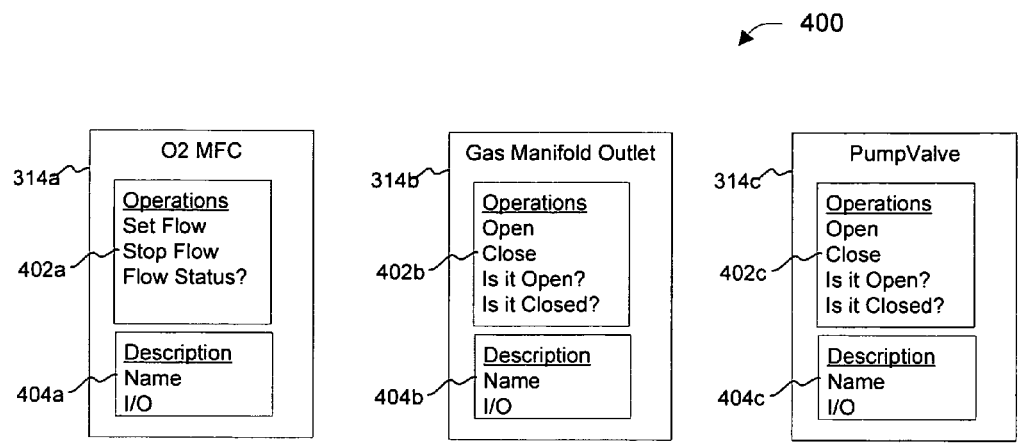
FIG. 4 is a diagrammatic representation of the device objects of FIG. 3 in accordance with one embodiment of the present invention.

FIG. 4 is a diagrammatic representation of the device objects 314 of FIG. 3 in accordance with one embodiment of the present invention. In general, each device object 314 includes a set of operations that can be selected by a user. An operation may simply be triggered by a user, but may also require the user to enter one or more parameter value(s) for such operation. As shown, the device object "$O_2$ MFC" 314a includes the following operations 402a: "Set Flow", "Stop Flow", and "Flow Status" for setting a flow, stopping a flow, and obtaining the status of such flow, respectively. The device object "Gas Manifold Outlet Valve" 314b includes these operations 402b: Open, Close, "Is it Open?", and "Is it Closed?" which serve to open or close the valve and determine whether the valve is open and closed, respectively. The device object "Pump Valve" includes a similar set of operations 402c.

Each device object may also include a description, such as Name and IO information 404. For instance, the IO information specifies which one or more IO points in the IO Layer 304 are coupled to or associated with the particular device object. As described above, each IO point is mapped to a corresponding physical communication channel of a particular controller or the like. Additionally, sets of IO points can be grouped together in one or more abstract controller group(s). Accordingly, the IO information 402 of each device object 314 may identify one or more IO points as well as their abstract controller grouping.

Referring back to FIG. 3, each device object is associated with a hardware device. Device object "$O_2$ MFC" 314a represents hardware device "$O_2$ MFC" 322a. Device object "Gas Manifold Outlet Valve" 314b represents hardware device "Gas Manifold Outlet Valve" 822b. Device object "Pump Valve" 316c represents hardware device "Pump Valve" 322c.

Each device object may also be associated with one or more IO point(s) in an IO Layer 304. As shown, device object "$O_2$ MFC" 314a is associated with the following IO points of controller object 316a: $O_2V_{out}$ and $O_2V_{in}$ of controller object 316a. The device object "Gas Manifold Outlet Valve" 314b is associated with single IO point "Gas $D_o$" of the same controller object 316a. Finally, the device object "Pump Valve"

316c is associated with IO points "Pump Open $D_i$" and "Pump Close $D_i$" of controller object 316b and IO Points "Pump Open $D_o$" and "Pump Close $D_o$" of controller object 316c.

Each of the controller objects 316 and its corresponding IO points may be associated with a particular controller driver 318 in the Driver Layer 306. A controller driver 318 can serve to map a command for a particular IO point to a command to a hardware controller 320 to thereby output a signal from the hardware controller to a particular hardware device 322 or input a signal from a particular hardware device 322. That is, commands issued with respect to a device object are translated by the Driver Layer 306 into commands issued with respect to particular hardware device in the Hardware Layer 308.

Said in another way, each IO point corresponds to a particular communication channel of a hardware controller, where this communication channel is coupled to a hardware device. A driver translates an operation with respect to a particular IO point to an operation with respect to a communication channel and its corresponding hardware device IO. In one implementation, a driver translates an operation to a voltage input or reading for a particular hardware device communication channel. In the latter example, a value that is read from a communication channel may be represented by the corresponding IO point (for instance an analog voltage value may be translated into a equivalent, digital flow rate) so that the execution software may access the read value.

Figure 5:
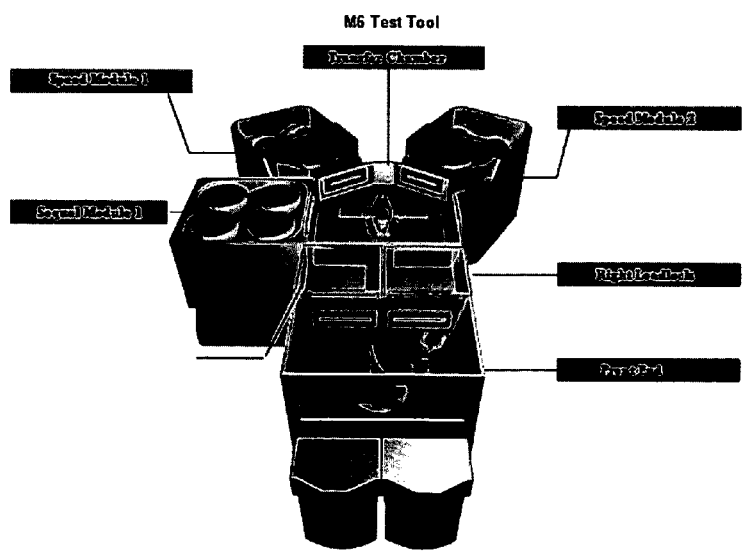
FIG. 5 illustrates a graphical user interface (GUI) having a plurality of selectable modules of a selected process tool in accordance with one implementation of the present invention.
Figure 6A:
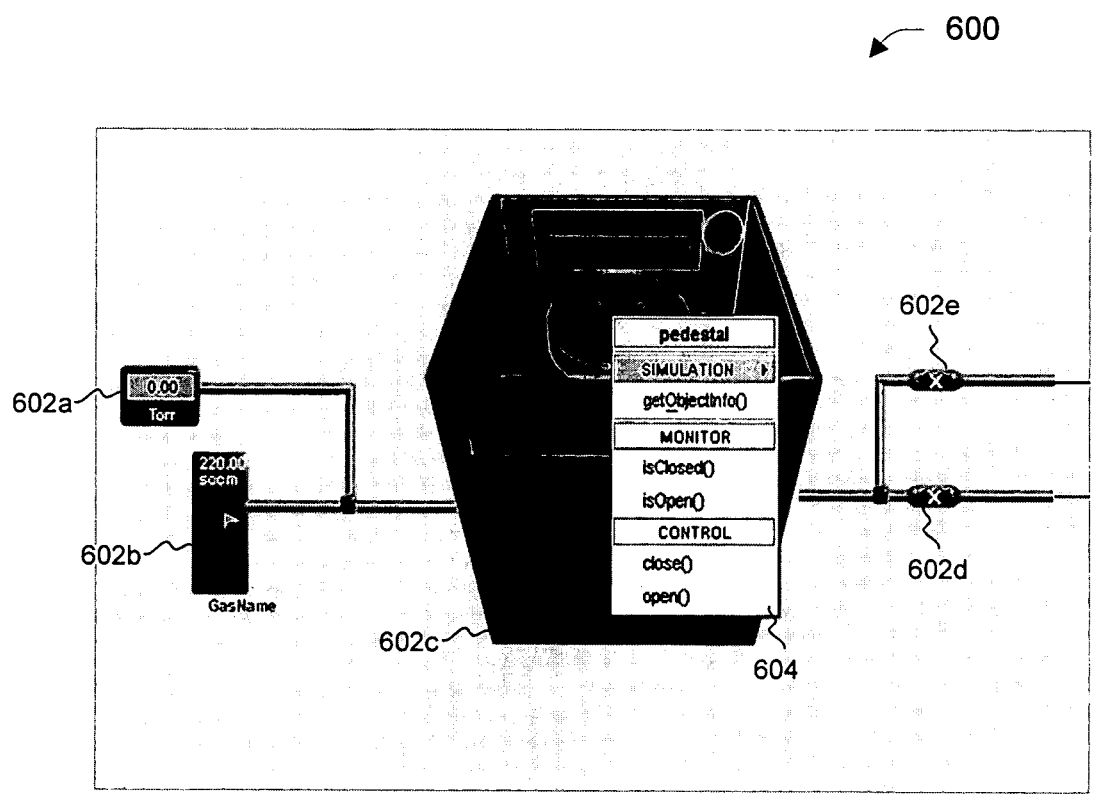
FIGS. 6A and 6B each show a graphical user interface for displaying a plurality of device objects for a particular processing module.

A few example operations are illustrated in FIG. 3, and these operations are numbered. At step 1, a setFlow(500) operation is initiated with respect to abstract device object "$O_2$ MFC" 314a. For instance, a user interacts with a graphical user interface (GUI) to enter parameters for a particular device of a process tool. In one implementation, a user first selects the management software for a particular tool, such as the "M6 Test Tool." After selection, the user is presented with a GUI illustrating the various modules of the selected too, such as the "M6 Test Tool," as shown in FIG. 5, for example. The user may then select a particular module after which the user is presented with the various configurable device objects of the selected module. FIG. 6A shows a GUI 600 displaying a plurality of device objects 602 for a particular processing module. As shown, a user can "right click" her mouse over one of the device objects, such as the pedestal object 602c, to then display a list of selectable operations 604. Of course, any suitable selection mechanism may be utilized besides a pull-down menu. In this example, the user may select a monitoring type operation such as "is Closed( )" to sense whether the pedestal is at a lowered position or "is Open( )" to sense whether it is a lifted position. The user may also select control type operations, such as "close( )" to lower the pedestal or "open( )" to lift the pedestal.

Figure 6B:
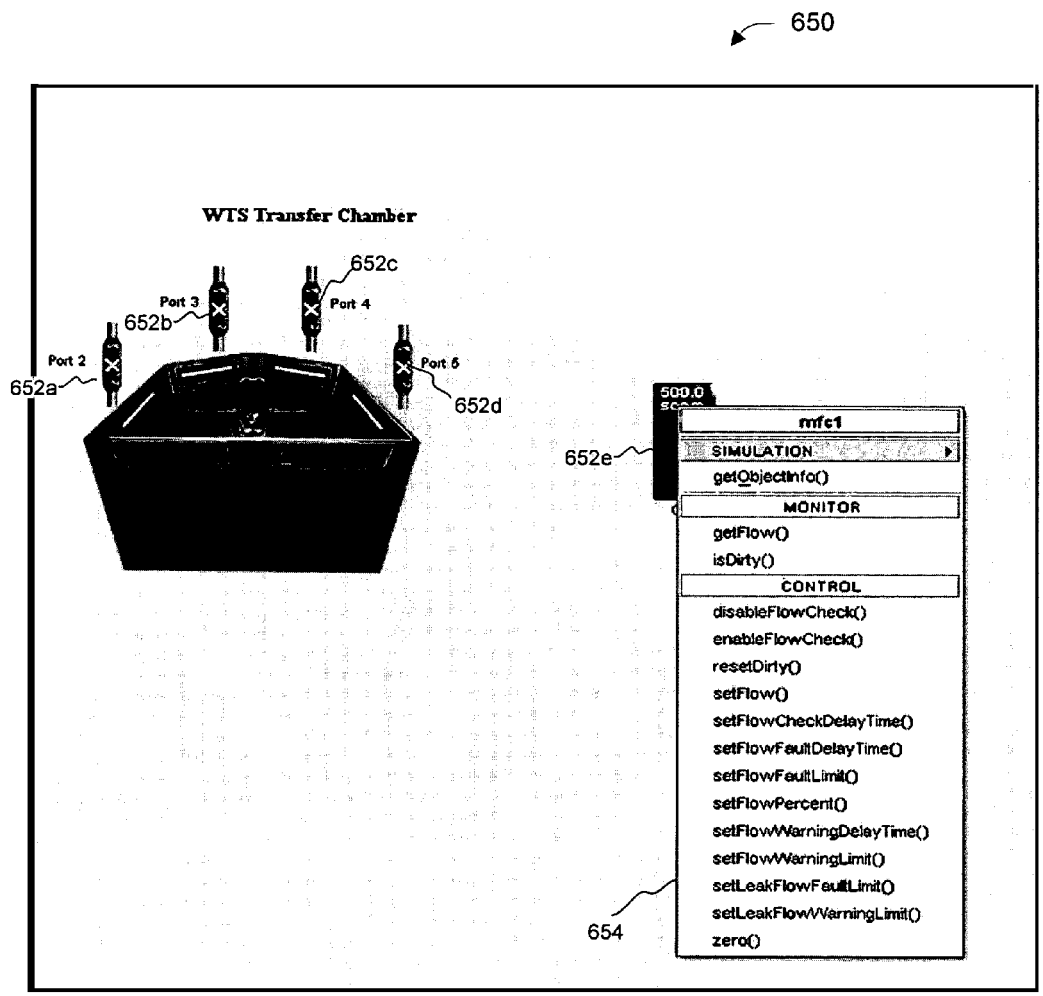

In another example, FIG. 6B shows a GUI 650 displaying a plurality of device objects 652 for a different processing module. As shown, a list of operations 654 are displayed after the user selects the MFC device object 652e. One of these operations is a "setFlow( )" operation. When the user selects the "setFlow( )" operation, the user is then presented with a mechanism for entering a desired flow value, e.g., 500.

In the illustrated configuration of FIG. 3, the "setFlow (500)" operation corresponds to the $O_2V_{out}$ IO point in the IO Layer. The corresponding driver for this IO point, IOC_1 Driver 318a of driver layer 306, is configured to recognize how this setFlow(500) operation is to be converted or translated into an operation that is applied to a particular communication channel of a particular hardware controller. The IOC_1 Driver 318a determines that setting a flow to 500 is accomplished by setting a voltage to 5V (Step 2) with respect to a particular communication channel, i.e., channel IO(1) of hardware controller IOC_1 320a. When the communication channel requires a digital format, the driver IOC_1 also converts the analog voltage value (5V) into a digital value (e.g., 2047 with a maximum 4065 value for a 10V maximum). That is, each driver is configured with digital-to-analog mappings when required by a corresponding hardware controller. The driver IOC_1 also translates the operation setFlow(500) into the appropriate communication protocol. For example, the hardware controller may require the command "Set PortX (y)" with "X" being set to a port identifier (e.g., 3) that corresponds to the AO(1) communication channel for the flow input of the MFC device 322a and "y" being the digital voltage value (e.g., 2047). In this example, setFlow(500) is translated into the input command "Set Port3(2047)" (Step 3), which is input to the hardware controller IOC_1 320a. The hardware controller IOC_1 then responds to this input command by outputting an analog voltage (e.g., 5.001 V) out AO(1) to the flow input of the MFC device 322a.

In a next event example, a user applies the operation "Open" to the "Gas Manifold Outlet Valve" device object 314b in step 5. The "Open" operation for this device corresponds to IO point "$GasD_o$" of controller object 316a in IO Layer 304. The IOC_1 Driver 318a translates an open operation for IO point "$GasD_o$" as corresponding to a set(true) operation (Step 6) for communication channel DO(1) of hardware IOC_1 controller 320a, which is coupled to the "Close/Open" input of the Gas Manifold Outlet Valve hardware device 322b. The driver 318a inputs a "Set Port9(true)" command (Step 7) to the hardware IOC_1 controller 320a, where port 9 corresponds to communication channel DO(1). In response, the hardware controller 320a outputs a "high" signal (e.g., 5V) (Step 8) on DO(1) to the Close/Open input of the Gas Manifold Outlet Valve, which causes this valve to open.

In a final example sequence of events, a user initiates a "Close" operation (Step 9) with respect to device object "Pump Valve" 314c. For this type of valve, there are two inputs, e.g., for controller two pneumatic inlet and exit valves, for controller opening an closing of the valve. Thus, the "Close" operation corresponds to two IO points, "Pump Close Do" and "Pump Open Do" of IO controller object 316.

When the operation "Close" is initiated with respect to these two IO points, the corresponding driver "Backplane" 318c recognizes that this operation will be translated into two operations: a set(false) operation (step 10) for the communication channel DO(2) of the backplane type hardware controller 320c that is coupled to the "Open" input of the pump valve hardware device 322c and a set(true) operation (step 11) for the communication channel DO(1) of the same hardware controller that is coupled to the "Close" input of the same valve 322c. Since the hardware controller is a backplane type controller, the driver 318c is configured with an address mapping for the different communication channels. In this example, a "Set Low (adr1)", which adr1 corresponds to the pump valve "Open In" input communication channels, is input to the backplane controller in Step 13. Likewise, a "Set High (adr2)", which adr2 corresponds to the pump valve "Close In" input, is input to the backplane controller in Step 14. In response, a "Low" signal (step 15) and a "High" signal (step 16) are output to the Open input and Close input, respectively, of the Pump Valve device 322c.

Figure 7:
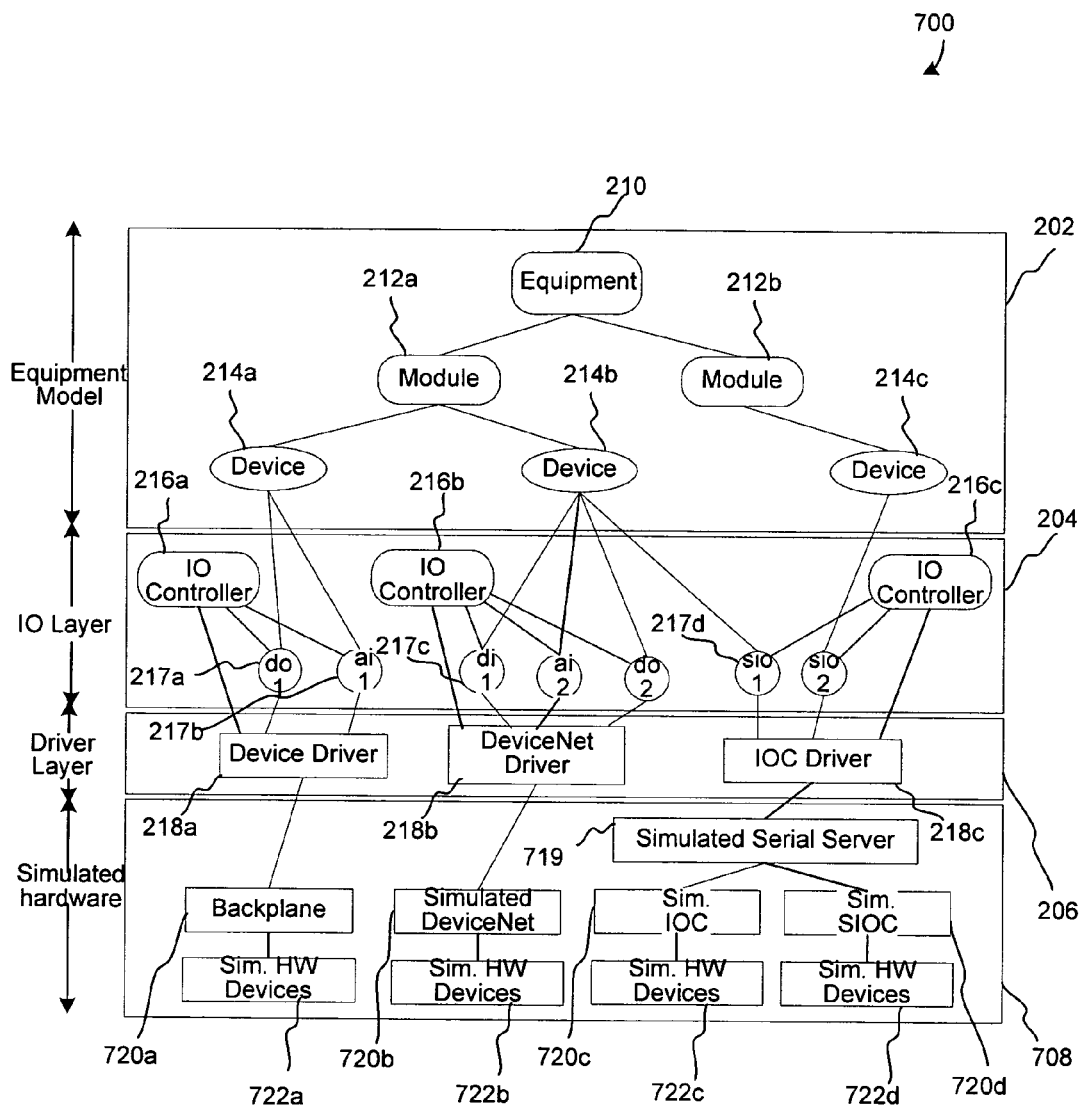
FIG. 7 is a diagrammatic representation of a control system having components similar to the components of FIG. 2, wherein the hardware has been replaced by a simulated hardware module in accordance with an example implementation of the present invention.

The particular configuration of the software components described herein allow a simulation feature to be easily integrated into the present scheme. FIG. 7 is a diagrammatic representation of a control system 700 having components similar to the components of FIG. 2, wherein the hardware has been replaced by a simulated hardware module 708 in accordance with an example implementation of the present invention. In general, the behavior of each hardware component is simulated in response to interactions with the software modules, e.g., the Equipment Module 202, IO Layer 204, and Driver Layer 206. For example, when a signal is input to a particular simulated controller to be output to a simulated hardware device, the simulated controller and device simulate the output response from such hardware device. For instance, when a digital signal is input (DO) to a valve to close it, an output signal is simulated to indicate the valve closing and this signal includes the appropriate timing for such a "closing" event for this particular type of device and controller. Any suitable device's or controller's behavior may be simulated.

The control techniques of the present invention may be implemented in any suitable combination of software and/or hardware system, such as processing system's processor. Regardless of the system's configuration, it may employ one or more memories or memory modules configured to store data, program instructions for the general-purpose processing operations and/or the inventive techniques described herein. The program instructions may control the operation of an operating system and/or one or more applications, for example. The memory or memories may also be configured to store IO Point values (input and output), voltage-to-digital mappings, port-to-communication channel mappings, address-to-communication channel mappings, etc.

Because such information and program instructions may be employed to implement the systems/methods described herein, the present invention relates to machine readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). The invention may also be embodied in a carrier wave traveling over an appropriate medium such as airwaves, optical lines, electric lines, etc. Examples of program instructions include both machine code, such as produced by a compiler, and files containing higher level code that may be executed by the computer using an interpreter.

Embodiments of the present invention employ various processes involving data stored in or transferred through one or more computer systems. Embodiments of the present invention also relate to the apparatus for performing these operations. These apparatus and processes may be employed to monitor characteristics of one or more components, retrieve stored specifications from databases or other repositories, and compare such monitored characteristics to the specifications. The monitoring apparatus of this invention may be specially constructed for the required purposes, or it may be a general-purpose computer selectively activated or reconfigured by a computer program and/or data structure stored in the computer. The processes presented herein are not inherently related to any particular computer or other apparatus. In particular, various general-purpose machines may be used with programs written in accordance with the teachings herein, or it may be more convenient to construct a more specialized apparatus to perform the required method steps.

Figure 8:
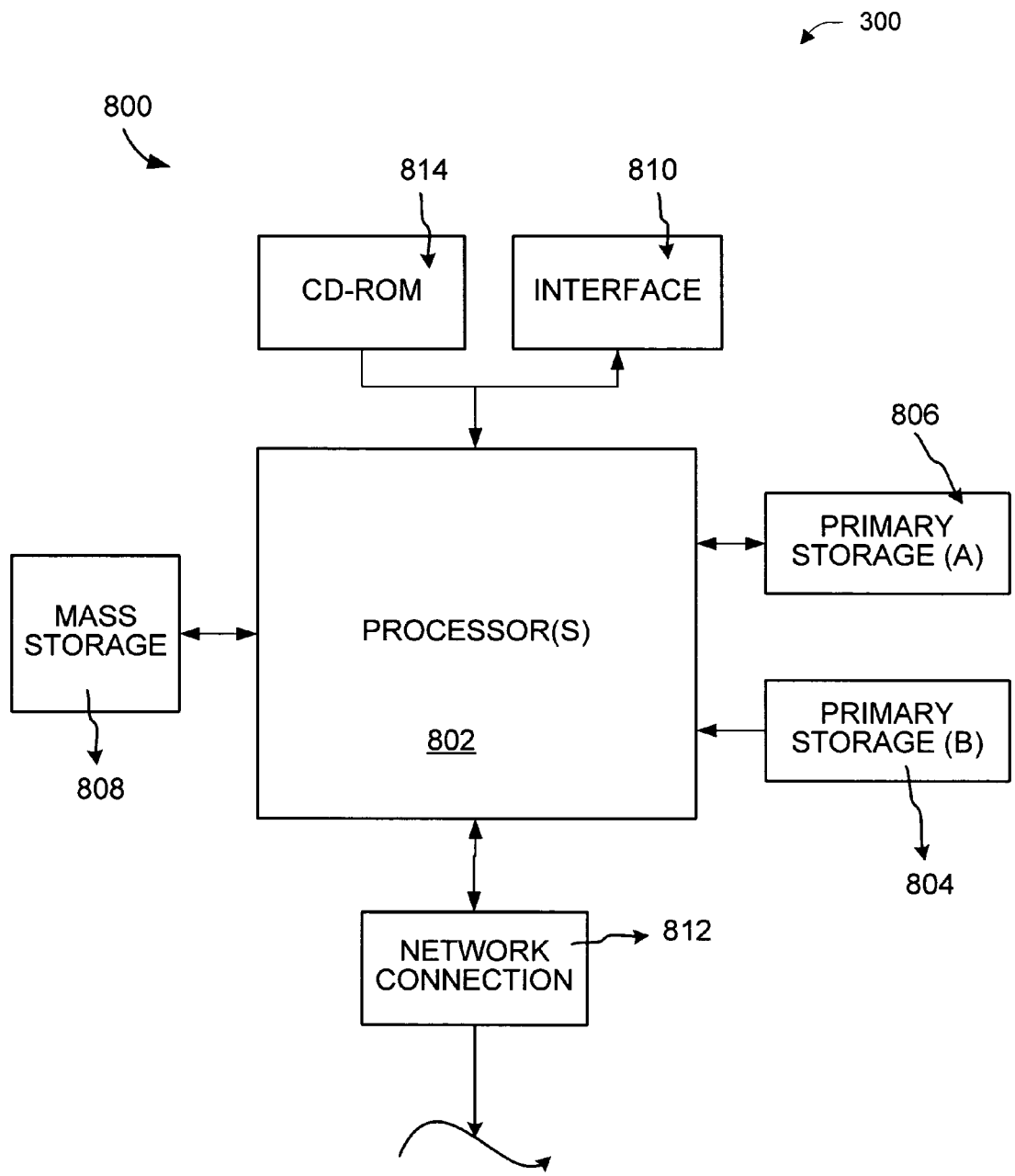
FIG. 8 illustrates a typical computer system that, when appropriately configured or designed, can serve as a control system of this invention.

FIG. 8 illustrates a typical computer system that, when appropriately configured or designed, can serve as a control system of this invention. The computer system 800 includes any number of processors 802 (also referred to as central processing units, or CPUs) that are coupled to storage devices including primary storage 806 (typically a random access memory, or RAM), primary storage 804 (typically a read only memory, or ROM). CPU 802 may be of various types including microcontrollers and microprocessors such as programmable devices (e.g., CPLDs and FPGAs) and unprogrammable devices such as gate array ASICs or general purpose microprocessors. As is well known in the art, primary storage 804 acts to transfer data and instructions uni-directionally to the CPU and primary storage 806 is used typically to transfer data and instructions in a bi-directional manner. Both of these primary storage devices may include any suitable computer-readable media such as those described above. A mass storage device 808 is also coupled bi-directionally to CPU 802 and provides additional data storage capacity and may include any of the computer-readable media described above. Mass storage device 808 may be used to store programs, data and the like and is typically a secondary storage medium such as a hard disk. It will be appreciated that the information retained within the mass storage device 808, may, in appropriate cases, be incorporated in standard fashion as part of primary storage 806 as virtual memory. A specific mass storage device such as a CD-ROM 814 may also pass data uni-directionally to the CPU.

CPU 802 is also coupled to an interface 810 that connects to one or more input/output devices such as such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPU 802 optionally may be coupled to an external device such as a database or a computer or telecommunications network using an external connection as shown generally at 812. With such a connection, it is contemplated that the CPU might receive information from the network, or might output information to the network in the course of performing the method steps described herein.

Although the foregoing invention has been described in some detail for purposes of clarity of understanding, it will be apparent that certain changes and modifications may be practiced within the scope of the appended claims. Therefore, the described embodiments should be taken as illustrative and not restrictive, and the invention should not be limited to the details given herein but should be defined by the following claims and their full scope of equivalents.

What is claimed is:

1. A system for controlling a heterogeneous mixture of hardware controller and/or devices associated with a semiconductor process tool, the system comprising:

a process management module that is configurable to control a plurality of hardware devices of a semiconductor process tool;

a plurality of generic device objects upon which the process management module is operable to indirectly control corresponding hardware devices of the semiconductor process tool via a reconfigurable mapping between the generic devices and a plurality of selected communication channels of the hardware devices, wherein each generic device object is controllable in a generic manner that is independent of a particular communication protocol utilized by the corresponding hardware device, wherein the reconfigurable mapping is alterable so as to correspond to different sets of communications channels of different sets of hardware devices that utilize different sets of communication protocols; and a device interface module for translating each generic operation performed with respect to a selected generic device object into a translated protocol-specific operation performed with respect to the selected generic object's corresponding hardware device and its respective communication protocol and for inputting the translated operations to the corresponding hardware devices so as to control operation of such corresponding hardware devices, wherein the device interface module is configured to translate the generic operation into the corresponding hardware device's communication protocol as specified by the reconfigurable mapping of the selected generic device.

2. A system as recited in claim 1, wherein the process management module includes a plurality of module objects that are each configurable to control a particular hardware module of the process tool via performing generic operations with respect to one or more of the generic device object(s) so that generic operation of each hardware module is independent of operation of a plurality of other hardware modules.

3. A system as recited in claim 1, wherein the reconfigurable mapping of each generic device object maps each of one or more input/output (IO) point(s) of the each generic device object to a corresponding communication channel of a corresponding hardware device and the device interface module is operable to translate each generic operation on a particular IO point into a communication protocol utilized by the corresponding communication channel that is mapped to the particular IO point by the corresponding reconfigurable mapping.

4. A system as recited in claim 3, wherein the hardware devices are in a form of one or more hardware controllers coupled to one or more other hardware devices and the device interface module includes one or more drivers that each correspond to a particular hardware controller that is coupled to one or more hardware devices via one or more communication channels that are each mapped to a particular IO point, and wherein each driver translates a generic operation that is performed with respect to each IO point that is mapped to a mapped communication channel of the each driver's corresponding hardware controller into a translated protocol-specific operation with respect to the corresponding hardware controller's mapped communication channel.

5. A system as recited in claim 4, wherein the translated protocol-specific operation includes inputting an input command to the each driver's corresponding hardware controller that specifies an operation is to be performed with respect to the mapped communication channel.

6. A system as recited in claim 5, wherein the mapped communication channel is specified by a port identifier, a IO identifier, and/or an address value.

7. A system as recited in claim 6, wherein the input command includes a digital signal, an analog signal, and/or a serial IO signal.

8. A system as recited in claim 3, wherein each reconfigurable mapping of the IO point(s) of each generic device object to corresponding communication channels that is utilized by the device interface module is reconfigurable without alteration of the process management module or the generic device objects so that operation of the process management module and the generic device objects is independent of a configuration of such mapping.

9. A system as recited in claim 5, wherein the translated protocol-specific operation includes inputting a signal, via the mapped communication channel, to the corresponding hardware device that is coupled to the mapped communication channel.

10. A system as recited in claim 5, wherein the translated protocol-specific operation includes outputting an output signal, via the mapped communication channel, from the corresponding hardware device that is coupled to the mapped communication channel so that the output signal is represented by a value of the IO point that corresponds to the mapped communication channel.

11. A system as recited in claim 3, wherein the process management module is configured to perform operations with respect to the IO points and not the communications channels of the hardware devices.

12. A system as recited in claim 1, wherein the process management is operable to interact directly with the generic device objects and not directly with the hardware devices.

13. A system as recited in claim 3, further comprising a plurality of controller objects for grouping one or more generic device objects and their IO point(s) together so that each controller object and its IO points can be operated on together as a group.

14. A system as recited in claim 1, wherein the system is in a form of computer instructions stored within at least one computer readable at least one computer readable.

15. A system as recited in claim 3, wherein each generic device object includes a set of generic operations that are selectable by a user whereby selection causes the selected generic operation to be performed on one or more IO point(s) that are mapped to the each generic device object, as well as to be indirectly performed with respect to the one or more communication channel(s) that are mapped to the mapped IO point(s).

16. A system as recited in claim 15, wherein at least one of the generic operations requires the user to input a parameter value for setting an operating condition of a corresponding hardware device.

17. A system as recited in claim 1, further comprising a simulation module having a plurality of simulated hardware devices each for simulating an operation of each of the hardware devices, wherein the device interface module is configured to translate generic operations performed with respect to the generic device objects into protocol-specific operations performed with respect to the simulated hardware devices.

18. A method for controlling a heterogeneous mixture of hardware controller and/or devices associated with a semiconductor process tool, using a plurality of generic device objects that are each associated with one or more operations, the method comprising:
configuring a first reconfigurable mapping between a first generic device object and one or more first communication channels of one or more hardware controller(s);
configuring a second reconfigurable mapping between a second generic device object and one or more second communication channels of one or more hardware device, wherein the first and second generic device objects are associated with a same first operation and the one or more first communication channels have a different protocol than the one or more second communication channels, wherein each of the first and second reconfigurable mappings is alterable so as to correspond to different sets of communications channels of different sets of hardware devices that utilize different sets of communication protocols;
when the first operation of the first generic device object is selected, translating the first operation of the first generic device object to a first translated operation based on a particular communication protocol of the first reconfigurable mapping and applying the first translated operation to the one or more first communication channel(s)

of one or more hardware controller(s) so as to control one or more hardware device that are coupled to such one or more first communication channel(s);

when the first operation of the second generic device object is selected, translating the first operation of the second generic device object to a second translated operation that differs from the first translated of the second reconfigurable mapping and applying the second translated operation to the one or more second communication channel(s) of the one or more hardware controller(s) so as to control one or more hardware device that are coupled to such one or more second communication channel(s).

19. A method as recited in claim 18, wherein the first operation of the first generic device object is translated into the first translated operation so that the first translated operation has a communication protocol utilized by a first hardware controller coupled to the mapped one or more first communication channel(s) and the first operation of the second generic device object is translated into the second translated operation so that the second translated operation has a communication protocol utilized by a second hardware controller coupled to the mapped one or more second communication channel(s).

* * * * *